US010858605B2

(12) United States Patent
Mukherjee et al.

(10) Patent No.: US 10,858,605 B2
(45) Date of Patent: Dec. 8, 2020

(54) ORGANOMODIFIED SILICONE FUEL ADDITIVE, COMPOSITIONS, AND METHODS OF USING THE SAME

(71) Applicant: Momentive Performance Materials Inc., Waterford, NY (US)

(72) Inventors: Narayan Mukherjee, Croton-on-Hudson, NY (US); Mark David Leatherman, Stamford, CT (US); Richard Conticello, Cortlandt Manor, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 16/182,671

(22) Filed: Nov. 7, 2018

(65) Prior Publication Data

US 2019/0144772 A1    May 16, 2019

Related U.S. Application Data

(60) Provisional application No. 62/584,173, filed on Nov. 10, 2017.

(51) Int. Cl.
| | |
|---|---|
| *C10L 1/28* | (2006.01) |
| *C10L 1/23* | (2006.01) |
| *C10L 10/04* | (2006.01) |
| *C08G 77/38* | (2006.01) |
| *C10L 10/18* | (2006.01) |
| *C10L 1/14* | (2006.01) |
| *C10L 10/12* | (2006.01) |
| *C10L 1/16* | (2006.01) |
| *C10L 1/2383* | (2006.01) |
| *C08G 77/00* | (2006.01) |

(52) U.S. Cl.
CPC .............. *C10L 1/285* (2013.01); *C08G 77/38* (2013.01); *C10L 1/143* (2013.01); *C10L 10/04* (2013.01); *C10L 10/12* (2013.01); *C10L 10/18* (2013.01); *C08G 77/70* (2013.01); *C10L 1/1616* (2013.01); *C10L 1/231* (2013.01); *C10L 1/2383* (2013.01); *C10L 2200/0446* (2013.01); *C10L 2200/0476* (2013.01); *C10L 2230/082* (2013.01); *C10L 2230/086* (2013.01); *C10L 2230/14* (2013.01); *C10L 2270/026* (2013.01)

(58) Field of Classification Search
CPC combination set(s) only.
See application file for complete search history.

(56) References Cited

U.S. PATENT DOCUMENTS

| | | |
|---|---|---|
| 3,233,986 A | 2/1966 | Morehouse |
| 4,054,554 A | 10/1977 | Buriks |
| 4,690,688 A | 9/1987 | Adams |
| 4,849,572 A | 7/1989 | Chen |
| 5,542,960 A | 8/1996 | Grabowski |
| 5,613,988 A | 3/1997 | Spiegler |
| 5,620,485 A | 4/1997 | Fey |
| 5,916,825 A | 6/1999 | Cherpeck |
| 5,925,151 A | 7/1999 | Decanio |
| 6,001,140 A | 12/1999 | Grabowski |
| 6,093,222 A | 7/2000 | Grabowski |
| 8,668,749 B2 | 3/2014 | Fang |
| 2010/0107479 A1 | 5/2010 | Richardson |
| 2012/0222348 A1 | 9/2012 | Bohnke |
| 2013/0217930 A1 | 8/2013 | Haensel |
| 2013/0312318 A1 | 11/2013 | Peretolchin |

FOREIGN PATENT DOCUMENTS

| | | | | |
|---|---|---|---|---|
| DE | 10314853 | | 10/2004 | |
| DE | 10314853 A1 | * | 10/2004 | ......... B01D 19/0409 |
| EP | 0909306 A1 | * | 4/1999 | ............ C10L 10/04 |
| EP | 2134771 A2 | * | 12/2009 | ............ C08G 77/10 |
| EP | 2628518 A1 | * | 8/2013 | ......... B01D 19/0409 |
| WO | 9801516 | | 1/1998 | |
| WO | 2008121310 | | 10/2008 | |

OTHER PUBLICATIONS

Tiehm "Degradation of polycyclic aromatic hydrocarbons in the presence of synthetic surfactants", Jan. 1, 1994 (Year: 1994).*
A Tiehm: "Degradation of polycyclic aromatic hydrogarbons in the presence of synthetic surfactants," Applied and Environmental Microbiology, 2014, pp. 258-263.
Patent Cooperation Treaty (PCT), International Search Report and Written Opinion for Application PCT/US2018/059546 filed Nov. 7, 2018, dated Feb. 15, 2019, International Searching Authority, EP.

* cited by examiner

*Primary Examiner* — Ellen M McAvoy
*Assistant Examiner* — Chantel L Graham
(74) *Attorney, Agent, or Firm* — Joseph Ostroff; McDonald Hopkins LLC

(57) ABSTRACT

An organomodified silicone material is shown and described herein. The organomodified silicone provides a material that can be used as an additive in a fuel oil, e.g., diesel fuel. The organomodified silicone acts as both a defoamer and a dehazer in a fuel oil.

39 Claims, No Drawings

ORGANOMODIFIED SILICONE FUEL ADDITIVE, COMPOSITIONS, AND METHODS OF USING THE SAME

CROSS-REFERENCE TO RELATED APPLICATIONS

The present application claims priority to and the benefit of U.S. Provisional Patent Application 62/584,173 titled "Organomodified Silicone Fuel Additive, Compositions and Methods of Using the Same" filed on Nov. 10, 2017, the entire disclosure of which is incorporated herein by reference in its entirety.

FIELD OF INVENTION

The present invention relates to an organomodified silicone compound suitable for use as an additive in a fuel oil, additive packages comprising such organomodified silicone compounds, and fuel oils comprising such organomodified silicone compounds additives or additive packages.

BACKGROUND

Diesel fuel is a complex mixture of a variety of aliphatic and aromatic hydrocarbons (including kerosene, gas oil, and biofuel) that has a tendency to foam quickly when it is pumped into fuel storage reservoirs or fuel tanks of motor vehicles. This can lead to multiple problems, including difficulty in measuring the actual liquid level of the fuel, blockage of the faces of gauges used to measure the flow of the fuel, slowing of the pumping process at filling stations or storage reservoirs, and unintended spillage of the fuel due to excessive foaming beyond the volume of the container.

Reduction of foaming is typically achieved by the addition of a foam control agent also known as anti-foam or defoamer. Defoamers should be effective at low concentration (typically 6 ppm or less in the fuel). Organic defoamers, e.g., polyacrylate defoamers, may be employed. These defoamers may be effective at concentrations of 100-200 ppm, but not as effective at lower concentrations. Silicone oils can also be used, and may be effective in the range of 10-20 ppm. Silicone oils, however, may result in low deaeration rates. Polysiloxanes have been used (e.g., U.S. Pat. No. 4,690,688). These siloxanes must typically be used at concentrations greater than what is desirable in engine systems.

Diesel fuels delivered to filling stations also may contain some amount of dispersed or dissolved water in their fuel reservoir. Dispersed or dissolved water may adversely affect the performance characteristics of diesel and create a hazy appearance in the fuel. Such wet fuel also can result in increased sludge deposition in the fuel tank and may negatively affect the performance of the combustion engine. As a result, use of a dehazer (sometimes also referred as a demulsifier) is often necessary during transportation and storage. The dehazer helps to prevent premature blocking of fuel filters, corrosion, carburetor icing, and possible fuel line freezing when excessive water is carried into the fuel delivery system. Typically, dehazers are organic-based polyoxyalkylene alkyl phenol formaldehyde resin-types, and up to 20 ppm could be used to treat the diesel fuel.

Typically, oil companies treat diesel fuel with multiple additives, such as detergents, cetane improvers, viscosity breakers, defoamers and dehazers (collectively known as "multifunctional diesel additive packages" or "DAPs"). Each oil company uses their preferred proprietary DAPs, which could improve some of the physical and/or chemical properties of fuel and may protect the engine from deterioration during its life cycle. There is still a desire to provide improved additives for use in a fuel oil.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In one aspect, provided is a fuel additive package comprising:

(A) 10-90% by weight of (i) at least one aromatic hydrocarbon or hydrocarbon mixture having a boiling point or a predominant boiling range within the temperature range from 100° C. to 300° C., or (ii) at least one $C_5$- to $C_{12}$-alkyl nitrate, or (iii) a mixture of (i) and (ii);

(B) 0.1 to 5% by weight of an organomodified silicone; and (C) 1 to 40% by weight of a detergent additive, where the sum of all components in the fuel additive package is 100%;

where the organomodified silicone (B) is the reaction product of (I) with (II) and optionally with (III) in addition to (II) where, (I) is a silanic hydrogen containing compound having the formula $M_a M^H_b D_c D^H_d T_e T^H_f Q_g$ where:

$M = R^1 R^2 R^3 SiO_{1/2}$,
$M^H = R^4 R^5 HSiO_{1/2}$
$D = R^6 R^7 SiO_{2/2}$
$D^H = R^8 HSiO_{2/2}$
$T = R^9 SiO_{3/2}$
$T^H = HSiO_{3/2}$
$Q = SiO_{4/2}$ where $R^1$, $R^2$, $R^3$, $R^4$, $R^5$, $R^6$, $R^7$, $R^8$, and $R^9$ are each independently selected from the group of monovalent hydrocarbon radicals containing 1 to 60 carbon atoms; the subscript a and b may be zero or positive subject to the limitation that when the subscript a is zero, b must be positive or when b is zero, a must be positive and $(a+b)=2$;

the subscript c is zero or positive and has a value ranging from about 0 to about 1,000 subject to limitation that $(c+d)>0$;

the subscript d is zero or positive and has a value ranging from about 0 to about 400 subject to limitation that $(c+d)>0$;

the subscript e is zero or positive and has a value ranging from about 0 to about 50 subject to limitation that $(e+f)<50$;

the subscript f is zero or positive and has a value ranging from about 0 to about 50 subject to limitation that $(e+f)<50$;

the subscript g is zero or positive and has a value ranging from 0 to about 20.

(II) is an unsaturated compound comprising at least one terminal unsaturated group having the formula $CH_2=C(R^{10})(R^{11})_h-O-(R^{12})_i(C_2H_4O)_j(C_3H_6O)_k(C_4H_8O)_l R^{13}$ where, $R^{10}$ is H or a monovalent hydrocarbon radical containing 1 to 6 carbon atoms; $R^{11}$ is a divalent hydrocarbon radical containing 1 to 6 carbons atoms; $R^{12}$ is selected from the group of divalent radical consisting of $-C_2H_4O-$, $-C_3H_6O-$, and $-C_4H_8O-$; $R^{13}$ is H, a monovalent hydrocarbon radical containing) to 6 carbons, or acetyl; the subscript h is zero or one; the subscript i is zero or one; the subscript j is zero or positive and has a value ranging from 0 to about 100 subject to the limitation that (j+k+l)>0; the subscript k is zero or positive and has a value ranging from 0 to about 100 subject to the limitation that (j+k+l)>0; the subscript l is zero or positive and has a value ranging from 0 to about 100 subject to the limitation that (j+k+l)>0; and optionally (III) an unsaturated compound comprising at least two unsaturated functional group having the formula $CH_2=C(R^{14})-B-(R^{15})C=CH_2$ where, $R^{14}$ and $R^{15}$ are independently H or a monovalent hydrocarbon radical containing 1 to 6 carbon atoms;

B is either E, F, or G

E is $(R^{11})_h-O-(R^{12})_i(C_2H_4O)_j(C_3H_6O)_k-(C_4H_8O)_l-(R^{12})-O-(R^{11})_h$ $R^{11}$ in E is a divalent hydrocarbon radical containing 1 to 6 carbon atoms; $R^{12}$ is chosen from a divalent radical of $-C_2H_4O-$, $-C_3H_6O-$, or $-C_4H_8O-$;

the subscript h is zero or one;

the subscript i is zero or one;

the subscript j is zero or positive and has a value ranging from 0 to about 100 subject to the limitation that (j+k+l)>0;

the subscript k is zero or positive and has a value ranging from 0 to about 100 subject to the limitation that (j+k+l)>0;

the subscript l is zero or positive and has a value ranging from 0 to about 100 subject to the limitation that (j+k+l)>0;

F is a divalent hydrocarbon radical consisting of 1-60 carbons, which can be linear or branched; and G is a silicon containing compound having a formula $(R^{16})(R^{17})SiO-((R^{18})(R^{19})SiO))_m-SiO(R^{20})(R^{21})$ where $R^{16}$, $R^{17}$, $R^{18}$, $R^{19}$, $R^{20}$, and $R^{21}$ are each independently selected from the group of monovalent hydrocarbon radicals containing 1 to 60 carbon atoms; and the subscript m is zero or positive and has a value ranging from 0 to about 1000.

In one embodiment, the organomodified silicone (B) $R^1$, $R^2$, $R^3$, $R^4$, $R^5$, $R^6$, $R^7$, $R^8$, and $R^9$ are independently selected from a monovalent radical containing 1-20 carbon atoms; c is 0 to about 500; d is 0 to about 60; e is 0 to about 10; f is 0 to about 10; j in (II) or (III) is 0 to about 40; k in (II) or (III) is 0 to about 40; l in (II) or (III) is 0 to 40; F is 1 to about 25; $R^{16}$, $R^{17}$, $R^{18}$, $R^{19}$, $R^{20}$, and $R^{21}$ are each independently selected from the group of monovalent hydrocarbon radicals containing 1 to 25 carbon atoms; and m is 0 to about 500.

In one embodiment of the fuel additive package of any previous embodiment, the organomodified silicone (B) in the silanic hydride (I), c is from about 40 to about 200, d is from about 5 to about 50, e is about 0 to about 1, and g is 0.

In one embodiment of the fuel additive package of any previous embodiment, j in the unsaturated compound (II) is about 1 to about 20, k is about 1 to about 25, and l is 0.

In one embodiment of the fuel additive package of any previous embodiment, $R^1$-$R^9$ is methyl.

In one embodiment of the fuel additive package of any previous embodiment, $R^{10}$ is methyl, $R^{11}$ and $R^{12}$ are methylene, and h is 1.

In one embodiment of the fuel additive package of any previous embodiment, the ratio of c to d in the silanic hydride (I) is from about 6:1 to about 1:6.

the ratio of j to (j+k+l) in the unsaturated compound (II) is from 0.25 to 0.95;

the ratio of k to (j+k+l) is 0.05 to 0.75; and the ratio of l to (j+k+l) is 0.05 to 0.75.

In one embodiment of the fuel additive package of any previous embodiment, l is zero in the unsaturated compound (II), the ratio of j to (j+k) in the unsaturated compound (II) is from 0.25 to 0.95; and the ratio of k to (j+k) is 0.05 to 0.75.

In one embodiment of the fuel additive package of any previous embodiment, the package comprises from about 0.5 to about 2.5% by weight of the organomodified silicone (B).

In one embodiment of the fuel additive package of any previous embodiment, (A) comprises the (i) at least one aromatic hydrocarbon or hydrocarbon mixture having a boiling point or a predominant boiling range within the temperature range from 100° C. to 300° C.

In one embodiment of the fuel additive package of any previous embodiment, (A) comprises the (ii) at least one $C_5$- to $C_{12}$-alkyl nitrate.

In one embodiment of the fuel additive package of any previous embodiment, (A) comprises (i) and (ii).

In one embodiment of the fuel additive package of any previous embodiment, the fuel additive package is free of a separate organic-based dehazer material.

In another aspect, provided is a composition comprising (a) a fuel oil, and (b) the fuel additive package of any previous embodiment.

In one embodiment, the organomodified silicone (B) $R^1$, $R^2$, $R^3$, $R^4$, $R^5$, $R^6$, $R^7$, $R^8$, and $R^9$ are independently selected from a monovalent radical containing 1-20 carbon atoms; c is 0 to about 500; d is 0 to about 60; e is 0 to about 10; f is 0 to about 10; j in (II) or (III) is 0 to about 40; k in (II) or (III) is 0 to about 40; l in (II) or (III) is 0 to 40; F is 1 to about 25; $R^{16}$, $R^{17}$, $R^{18}$, $R^{19}$, $R^{20}$, and $R^{21}$ are each independently selected from the group of monovalent hydrocarbon radicals containing 1 to 25 carbon atoms; and m is 0 to about 500.

In one embodiment of the composition of any previous embodiment, the organomodified silicone (B) in the silanic hydride (I), c is from about 40 to about 200, d is from about 5 to about 50, e is about 0 to about 1, and g is 0.

In one embodiment of the composition of any previous embodiment, in the unsaturated compound (II), j is about 1 to about 20, k is about 1 to about 25, and l is 0.

In one embodiment of the composition of any previous embodiment, $R^1$-$R^9$ is methyl.

In one embodiment of the composition of any previous embodiment, $R^{10}$ is methyl, $R^{11}$ and $R^{12}$ are methylene, and h is 1.

In one embodiment of the composition of any previous embodiment, the ratio of c to d is from about 6:1 to about 1:6.

In one embodiment of the composition of any previous embodiment, the ratio of j to (j+k+l) in the unsaturated compound (II) is from 0.25 to 0.95; the ratio of k to (j+k+l) is 0.05 to 0.75; and the ratio of l to (j+k+l) is 0.05 to 0.75.

In one embodiment of the composition of any previous embodiment, l is zero in the unsaturated compound (II), the ratio of j to (j+k) in the unsaturated compound (II) is from 0.25 to 0.95; and the ratio of k to (j+k) is 0.05 to 0.75.

In one embodiment of the composition of any previous embodiment, the fuel additive package comprises from about 0.5 to about 2.5% by weight of the organomodified silicone (B).

In one embodiment of the composition of any previous embodiment, (A) comprises the (i) at least one aromatic hydrocarbon or hydrocarbon mixture having a boiling point or a predominant boiling range within the temperature range from 100° C. to 300° C.

In one embodiment of the composition of any previous embodiment, (A) comprises the (ii) at least one $C_5$- to $C_{12}$-alkyl nitrate.

In one embodiment of the composition of any previous embodiment, (A) comprises (i) at least one aromatic hydrocarbon or hydrocarbon mixture having a boiling point or a predominant boiling range within the temperature range from 100° C. to 300° C. and (ii) at least one $C_5$- to $C_{12}$-alkyl nitrate.

In one embodiment of the composition of any previous embodiment, the fuel additive package is added in an amount of from about 50 ppm to about 3000 ppm by weight based on the total weight of the composition.

In one embodiment of the composition of any previous embodiment, the organomodified silicone (a) is present in an amount of 1 ppm to 20 ppm based on the weight of the composition.

In still another aspect, provided is a method of treating a fuel composition comprising adding the fuel additive package of any of the previous embodiments to a fuel oil, wherein the fuel additive package acts as both a defoamer and a dehazer in the fuel composition.

The following description discloses various illustrative aspects. Some improvements and novel aspects may be expressly identified, while others may be apparent from the description.

In still yet another aspect, provided is an organomodified silicone that is the reaction product of (I) with (II) and optionally with (III) in addition to (II) where, (I) silanic hydrogen containing compound having the formula $M_a M^H_b D_c D^H_d T^e T^H_f Q_g$ where:

$M = R^1 R^2 R^3 SiO_{1/2}$ $M^H = R^4 R^5 HSiO_{1/2}$ $D = R^6 R^7 SiO_{2/2}$ $D^H = R^8 HSiO_{2/2}$ $T = R^9 SiO_{3/2}$ $T^H = HSiO_{3/2}$ $Q = SiO_{4/2}$ where $R^1$, $R^2$, $R^3$, $R^4$, $R^5$, $R^6$, $R^7$, $R^8$, and $R^9$ are each independently selected from the group of monovalent hydrocarbon radicals containing 1 to 60 carbon atoms;

the subscript a and b may be zero or positive subject to the limitation that when the subscript a is zero, b must be positive or when b is zero, a must be positive and (a+b)=2;

the subscript c is zero or positive and has a value ranging from about 0 to about 1,000 subject to limitation that (c+d)>0;

the subscript d is zero or positive and has a value ranging from about 0 to about 400 subject to limitation that (c+d)>0;

the subscript e is zero or positive and has a value ranging from about 0 to about 50 subject to limitation that (e+f)<50;

the subscript f is zero or positive and has a value ranging from about 0 to about 50 subject to limitation that (e+f)<50; and the subscript g is zero or positive and has a value ranging from 0 to about 20.

(II) unsaturated compound comprising at least one terminal unsaturated group having the formula $CH_2$=$C(R^1)(R^{11})_h$—O—$(R^{12})_i(C_2H_4O)_j(C_3H_6O)_k(C_4H_8O)_lR^{13}$ where, $R^{10}$ is H or a monovalent hydrocarbon radical containing 1 to 6 carbon atoms; $R^{11}$ is a divalent hydrocarbon radical containing 1 to 6 carbon atoms; $R^{12}$ is selected from the group of divalent radical consisting of —$C_2H_4O$—, —$C_3H_6O$—, and —$C_4H_8O$—; $R^{13}$ is H, a monovalent hydrocarbon radical containing 1 to 6 carbons, or acetyl; the subscript h is zero or one; the subscript i is zero or one; the subscript j is zero or positive and has a value ranging from 0 to about 100 subject to the limitation that (j+k+l)>0; the subscript k is zero or positive and has a value ranging from 0 to about 100 subject to the limitation that (j+k+l)>0; the subscript l is zero or positive and has a value ranging from 0 to about 100 subject to the limitation that (j+k+l)>0; and optionally (III) an unsaturated compound comprising at least two unsaturated functional group having the formula $CH_2$=$C(R^{14})$—B—$(R^{15})C$=$CH_2$, where, $R^{14}$ and $R^{15}$ are independently H or a monovalent hydrocarbon radical containing 1 to 6 carbon atoms;

B is either E, F, or G

E is $(R^{11})_h$—O—$(R^{12})_i(C_2H_4O)_j(C_3H_6O)_k(C_4H_8O)_l$—$(R^{12})$—O—$(R^{11})_h$ $R^{11}$ in E is a divalent hydrocarbon radical containing 1 to 6 carbon atoms; $R^{12}$ is chosen from a divalent radical of —$C_2H_4O$—, —$C_3H_6O$—, or —$C_4H_8O$—;

the subscript h is zero or one;

the subscript i is zero or one;

the subscript j is zero or positive and has a value ranging from 0 to about 100 subject to the limitation that (j+k+l)>0;

the subscript k is zero or positive and has a value ranging from 0 to about 100 subject to the limitation that (j+k+l)>0;

the subscript l is zero or positive and has a value ranging from 0 to about 100 subject to the limitation that (j+k+l)>0;

F is a divalent hydrocarbon radical consisting of 1-60 carbons, which can be linear or branched; and G is a silicon containing compound having a formula $(R^{16})(R^{17})SiO$—$((R^{18})(R^{19})SiO))_m$—$SiO(R^{20})(R^{21})$ where $R^{16}$, $R^{17}$, $R^{18}$, $R^{19}$, $R^{20}$, and $R^{21}$ are each independently selected from the group of monovalent hydrocarbon radicals containing 1 to 60 carbon atoms; and the subscript m is zero or positive and has a value ranging from 0 to about 1000.

In one embodiment of the organomodified silicone, $R^1$, $R^2$, $R^3$, $R^4$, $R^5$, $R^6$, $R^7$, $R^8$, and $R^9$ are independently selected from a monovalent radical containing 1-20 carbon atoms; c is 0 to about 500; d is 0 to about 60; e is 0 to about 10; f is 0 to about 10; j in (II) or (III) is 0 to about 40; k in (II) or (III) is 0 to about 40; l in (II) or (III) is 0 to 40; F is 1 to about 25; $R^{16}$, $R^{17}$, $R^{18}$, $R^{19}$, $R^{20}$, and $R^{21}$ are each independently selected from the group of monovalent hydrocarbon radicals containing 1 to 25 carbon atoms; and m is 0 to about 500.

In one embodiment of the organomodified silicone according to any previous embodiment, in the silanic hydride (I), c is from about 40 to about 200, d is from about 5 to about 50, e is about 0 to about 1, and g is 0.

In one embodiment of the organomodified silicone according to any previous embodiment, in the unsaturated compound (II), j is about 1 to about 20, k is about 1 to about 25, and l is 0.

In one embodiment of the organomodified silicone according to any previous embodiment, $R^1$-$R^9$ is methyl.

In one embodiment of the organomodified silicone according to any previous embodiment, $R^{10}$ is methyl, $R^{11}$ and $R^{12}$ are methylene, and h is 1.

In one embodiment of the organomodified silicone according to any previous embodiment, the ratio of c to d is from about 6:1 to about 1:6.

In one embodiment of the organomodified silicone according to any previous embodiment, the ratio of j to (j+k+l) in the unsaturated compound (II) is from 0.25 to 0.95; the ratio of k to (j+k+l) is 0.05 to 0.75; and the ratio of l to (j+k+l) is 0.05 to 0.75.

In one embodiment of the organomodified silicone according to any previous embodiment, l is zero in the unsaturated compound (II), the ratio of j to (j+k) in the unsaturated compound (II) is from 0.25 to 0.95; and the ratio of k to (j+k) is 0.05 to 0.75.

The present invention provides for an organomodified silicon-based compound that has been found to be an effective defoamer in a fuel oil to suppress the foaming phenomena of fuel at low concentration (with or without biofuel) and that also acts as a dehazer by accelerating removing water from the fuel. Thus, the present materials and additives are such that a separate organic-based dehazer is not required in the DAP to treat the fuel. The compositions are particularly useful as a fuel additives, more specifically as a diesel fuel additive.

DETAILED DESCRIPTION

Reference will now be made to exemplary embodiments. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is an organomodified silicone, which is useful as an additive in a diesel fuel composition. The present organomodified silicone materials have been found to provide both defoaming and dehazing properties in a diesel fuel. Also provided are diesel additive packages comprising such organomodified silicone materials and fuel compositions comprising the organomodified silicone materials.

The organomodified silicone comprises the reaction product of component (I) with component (II) and optionally with component (III):

(I) a silanic hydrogen containing compound having the formula:

$M_a M^H_b D_c D^H_d T_e T^H_f Q_g$ where $M = R^1 R^2 R^3 SiO_{1/2}$
$M^H = R^4 R^5 HSiO_{1/2}$
$D = R^6 R^7 SiO_{2/2}$
$D^H = R^8 HSiO_{2/2}$
$T = R^9 SiO_{3/2}$
$T^H = HSiO_{3/2}$
$Q = SiO_{4/2}$ where $R^1$, $R^2$, $R^3$, $R^4$, $R^5$, $R^6$, $R^7$, $R^8$, and $R^9$ are each independently selected from a monovalent hydrocarbon radical containing 1 to 60 carbon atoms, 1 to 30 carbon atoms, 1 to 20 carbon atoms, 1 to 10 carbon atoms, 1 to 6 carbon atoms, or 1 to 4 carbon atoms;

the subscript a and b may be zero or positive subject to the provisos that when (i) the subscript a is zero, b must be positive, or (ii) when b is zero, a must be positive, and (iii) (a+b)=2;

the subscript c is zero or positive and has a value ranging from about 0 to about 1,000, 0 to about 500, 25 to 250, or 50 to 100, such that (c+d)>0;

the subscript d is zero or positive and has a value ranging from about 0 to about 400, 0 to about 200, 0 to about 100, 0 to about 60, such that (c+d)>0;

the subscript e is zero or positive and has a value ranging from about 0 to about 50, 0 to about 25, 0 to about 10, such that (e+f)<50;

the subscript f is zero or positive and has a value ranging from about 0 to about 50, 0 to about 25, 0 to about 10, such that (e+f)<50;

the subscript g is zero or positive and has a value ranging from 0 to about 20;

(II) an unsaturated compound comprising at least one terminal unsaturated group having the formula $CH_2=C(R^{10})(R^{11})_h—O—(R^{12})_i(C_2H_4O)_j(C_3H_6O)_k(C_4H_8O)_l R^{13}$ where $R^{10}$ is H or a monovalent hydrocarbon radical containing 1 to 6 carbon atoms; $R^{11}$ is a divalent hydrocarbon radical containing 1 to 6 carbons atoms; $R^{12}$ is chosen from a divalent radical of $—C_2H_4O—$, $—C_3H_6O—$, or $—C_4H_8O—$; $R^{13}$ is H, a monovalent hydrocarbon radical containing 1 to 6 carbons, or an acetyl;

the subscript h is zero or one;
the subscript i is zero or one;
the subscript j is zero or positive and has a value ranging from 0 to about 100, 0 to about 75, 0 to about 50, 0 to about 40, such that (j+k+l)>0;
the subscript k is zero or positive and has a value ranging from 0 to about 100, 0 to about 75, 0 to about 50, 0 to about 40, such that (j+k+l)>0;
the subscript l is zero or positive and has a value ranging from 0 to about 100, 0 to about 75, 0 to about 50, 0 to about 40, such that (j+k+l)>0; and (III) optionally an unsaturated compound comprising at least two unsaturated functional group having the formula $CH_2=C(R^{14})—B—(R^{15})C=CH_2$ where $R^{14}$ and $R^{15}$ are independently chosen from H or a monovalent hydrocarbon radical containing 1 to 6 carbon atoms;

B is either E, F, or G where

E is $(R^{11})_h—O—(R^{12})_i(C_2H_4O)_j(C_3H_6O)_k(C_4H_8O)_l—(R^{12})—O—(R^{11})_h$ $R^{11}$ in E is a divalent hydrocarbon radical containing 1 to 6 carbons atoms; $R^{12}$ is chosen from a divalent radical of $—C_2H_4O—$, $—C_3H_6O—$, or $—C_4H_8O—$;

the subscript h is zero or one;
the subscript i is zero or one;

the subscript j is zero or positive and has a value ranging from 0 to about 100, 0 to about 75, 0 to about 50, 0 to about 40, such that (j+k+l)>0;

the subscript k is zero or positive and has a value ranging from 0 to about 100, 0 to about 75, 0 to about 50, 0 to about 40, such that (j+k+l)>0;

the subscript l is zero or positive and has a value ranging from 0 to about 100, 0 to about 75, 0 to about 50, 0 to about 40, 0 to about 20, such that (j+k+l)>0;

F is a divalent hydrocarbon radical having 1-60 carbon atoms, 1-40 carbon atoms, 1-25 carbon atoms, 1-10 carbon atoms, 1-6 carbon atoms, which can be linear or branched; and G is a silicon containing compound having a formula $(R^{16})(R^{17})SiO—((R^{18})(R^{19})SiO))_m—SiO(R^{20})(R^{21})$ where $R^{16}$, $R^{17}$, $R^{18}$, $R^{19}$, $R^{20}$, and $R^{21}$ are each independently selected from a monovalent hydrocarbon radical having 1 to 60 carbon atoms, 1-40 carbon atoms, 1-25 carbon atoms, 1-10 carbon atoms, 1-6 carbon atoms; and the subscript m is zero or positive and has a value ranging from 0 to about 1000, 0 to about 750, 0 to about 500, 0 to about 250.

The expression "hydrocarbon group" means any hydrocarbon from which one or more hydrogen atoms has been removed and is inclusive of alkyl, alkenyl, alkynyl, cyclic alkyl, cyclic alkenyl, cyclic alkynyl, aryl, aralkyl, and arenyl groups and is inclusive of hydrocarbon groups containing at least one heteroatom such as oxygen or nitrogen. This includes monovalent and divalent hydrocarbon groups. The monovalent hydrocarbon group is a group formed by removing one hydrogen atom from an alkane (either two hydrogen atoms from the same carbon or one hydrogen atom from two different carbon atoms). Examples of suitable divalent hydrocarbon groups include, but are not limited to, methyl, ethyl, propyl, butyl, pentyl, hexylene, heptyl, octyl, nonyl, isopropyl, isobutyl, etc. The divalent hydrocarbon group is a group formed by removing two hydrogen atoms from an alkane (either two hydrogen atoms from the same carbon or one hydrogen atom from two different carbon atoms). Examples of suitable divalent hydrocarbon groups include, but are not limited to, methylene, ethylene, propylene, butylene, pentylene, hexylene, heptylene, octylene, nonylene, isopropylene, isobutylene, etc.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The composition comprising the reaction product of (I), (II), and optionally (III) may comprise a suitable solvent to reduce the viscosity of the reaction product. In one embodiment, the solvent is chosen from a hydrocarbon solvent. Non-limiting examples of such hydrocarbons are hexane, octane, decane, isopentane, iso-octane, triptane, cyclopentane, cyclohexane, benzene, toluene, xylene, and the like. Various fractions of naturally existing mixtures of hydrocarbons, such as certain fractions of petroleum, and aromatic solvents can also be used. Particularly suitable solvents are toluene, homologous mono- or dialkylbenzenes, and technical solvent mixtures which consist of aromatic hydrocarbons or comprise aromatic hydrocarbons as the main components. Examples of such technical solvent mixtures include, but are not limited to, those available under the trade names Shellsol® (manufacturer: RoyalDutch/Shell Group), Exxsol® or Solvesso® (manufacturer: ExxonMobil) or Solvent Naphtha In one or more embodiments, the compounds (I), (II), and optionally (III) may comprise any combination of the following characteristics:

the silanic hydride (I) is such that (i) c is about 0 to about 1000, 1 to about 800, about 5 to about 500, or about 10 to about 400; and d is about 0 to about 400, 1 to about 300, 2 to about 250, or 3 to about 100, where (c+d) is greater than 0; (ii) e is about 0 to about 50, about 0 to about 25, about 0 to 15, or about 0 to about 10; and f is about 0 to about 50, about 0 to about 25, about 0 to about 15, or about 0 to about 10, where (e+f) is less than 50; and (iii) g is 0 to about 20, 0 to about 15, 0 to about 10, and 0 to about 8;

the ratio of c to d in the silanic hydride (I) is from 6:1 to 1:6, 4:1 to 1:4, 3:1 to 1:3, 2:1 to 1:2, or 1:1;

the unsaturated compound (II) is such that j is about 0 to about 100, about 1 to about 80, about 1 to about 60, or about 1 to about 50; k is about 0 to about 100, about 1 to about 80, about 1 to 1 to about 80, about 1 to about 60, or about 1 to about 50; and l is about 0 to about 100, about 1 to about 80, about 1 to about 60, and about 1 to about 50; where (j+k+l) is greater than 0;

the ratio of j to (j+k+l) in the unsaturated compound (II) is from 0.25 to 0.95; the ratio of k to (j+k+l) is 0.05 to 0.75; and the ratio of l to (j+k+l) is 0.05 to 0.75;

l is zero in the unsaturated compound (II), the ratio of j to (j+k) in the unsaturated compound (II) is from 0.25 to 0.95; and the ratio of k to (j+k) is 0.05 to 0.75;

the optional unsaturated compound (III) is such that j is about 0 to about 100, about 1 to about 80, about 1 to about 60, or about 1 to about 50; k is about 0 to about 100, about 1 to about 80, about 1 to 1 to about 80, about 1 to about 60, or about 1 to about 50; and l is about 0 to about 100, about 1 to about 80, about 1 to about 60, and about 1 to about 50; where (j+k+l) is greater than 0;

the ratio of j to (j+k+l) in the unsaturated compound (III) is from 0.25 to 0.95; the ratio of k to (j+k+l) is 0.05 to 0.75; and the ratio of l to (j+k+l) is 0.05 to 0.75; and/or l is zero in the unsaturated compound (III), the ratio of j to (j+k) in the unsaturated compound (III) is from 0.25 to 0.95; and the ratio of k to (j+k) is 0.05 to 0.75.

In one embodiment, the organomodified compound is provided such that:

the silanic hydride (I) is such that $R^1$-$R^9$ are a C1-C4 monovalent radical, c is from about 40 to about 200, d is about 5 to about 50, e is about 0 to about 1, and f and j are 0;

the silanic hydride is such that the ratio of c units to d units is from 6:1 to 1:6, 4:1 to 1:4, 3:1 to 1:3, 2:1 to 1:2, or 1:1;

the unsaturated compound (II) is such that $R^{10}$ is a monovalent radical of 1-4 carbon atoms, $R^{11}$ and $R^{12}$ are divalent hydrocarbon radicals of 1-4 carbon atoms; j is about 1 to about 20, k is about 1 to about 25, and l is 0; and/or l is zero in the unsaturated compound (II), the ratio of j to (j+k) in the unsaturated compound (II) is from 0.25 to 0.95; and the ratio of k to (j+k) is 0.05 to 0.75.

The silanic hydride (I) can be provided by a variety of synthesis processes known to those skilled in the art. Non-limiting examples of processes for forming the hydride (I) include, for example, those processes described in U.S. Pat. Nos. 2,831,008, 4,831,174; 5,346,681 and 7,612,158. A typical method of preparation of compound (I) is to mix decamethylcyclopentasiloxane, polydimethylsiloxane, and polymethylhydrosiloxane in the appropriate/desired ratio and then allow them to react under acidic conditions. Examples of synthesis of compound (I) are provided herein. Compound (I) may also be referred to a as hydride intermediate.

Compounds (II) and (III) are olefinically modified materials (e.g. ethers/polyethers, hydrocarbon, poly alkyl modified siloxanes). Compounds (II) and (III) could be either random or block type polymers. Polyether based structures include, but are not limited to, those compounds that include allyl propyl ether, methallyl propyl ether, polyethyleneglycol allylether, polyethyleneglycol polypropyleneglycol allylether, polypropyleneglycol allyl ether, methoxy polyethyleneglycol allylether, methoxy polyethyleneglycol polypropyleneglycol allylether, butoxy polyethyleneglycol polyproplylene glycol allylether, methoxy polypropyleneglycol allylether, butoxy polypropyleneglycol allylether, polyethleneglycol polybutyleneglycol allylether, ethylene glycol divinyl ether, butanediol divinyl ether, polyethyleneglycol polypropyleneglycol polybutyleneglycol allylether, and their mixtures.

Hydrocarbon based structures include, but are not limited to, 1,5-hexadiene, 1,6-heptadiene, 1,7-octadiene, 1,9-decadiene, 1,10-undecadiene, 1,11-dodecadiene, and 1,13-tetradecadiene, or a mixture of two or more thereof, which optionally further contains an aromatic crosslinkable unsaturated monomer such as divinylbenzene, divinyltoluene, divinylxylene or divinylnaphthalene.

In embodiments, the unsaturated compound (II) is chosen selected from a compound of the formula $CH_2=CH-CH_2-O-(C_2H_4O)_{4.5}(C_3H_6O)_{5.1}-H$; $CH_2=CH-CH_2-O-(C_2H_4O)_{2.8}(C_3H_6O)_{3.2}-H$; $CH_2=CH-CH_2-O-(C_2H_4O)_{6.6}(C_3H_6O)_{7.2}-H$; $CH_2=CH-CH_2-O-(C_2H_4O)_{12}-CO-CH_3$; or a combination of two or more thereof.

In embodiments, the unsaturated compound (III) siloxane based structures include, but are not limited to, $CH_2=CH-SiO(CH3)_2-(SiO(CH3)_2)_v-OSi(CH3)_2-CH=CH_2$ where the subscript v is zero or positive and has a value ranging from 0 to about 1000. Non-limiting examples of suitable siloxane based structures for the unsaturated compound (III) include $CH_2=CH-SiO(CH3)_2-(SiO(CH3)_2)_8-OSi(CH3)_2-CH=CH_2$, and $CH_2=CH-SiO(CH3)_2-(SiO(CH3)_2)_{80}-OSi(CH3)_2-CH=CH_2$.

The method of producing the present polysiloxane-polyoxyalkylene block copolymers can be conducted in the same manner as any now known or later discovered method for producing polysiloxane-polyoxyalkylene block copolymers. Organomodified silicone copolymer can be made by reaction of the above mentioned hydride intermediate(s) with compound (II) and/or (III) under catalytic hydrosilylation reaction conditions such as described in, for example, U.S. Pat. Nos. 4,855,329 and 5,306,737. The reactions may be carried out with or without the presence of various solvents (such as Aromatic 150 from Exxon Mobil, or dipropyleneglycol (DPG) from Dow).

Hydrosilylation catalysts and their use are well known in the art and include complexes of such metals as rhodium, ruthenium, palladium, osmium, iridium, and platinum. Many types of platinum-containing hydrosilylation catalyst can be used herein, e.g., those having the formula $PtCl_2$ olefin and $HPtCl_3$ olefin as described in U.S. Pat. No. 3,159,601, hereby incorporated by reference. Other platinum-containing hydrosilylation catalyst include complexes of chloroplatinic acid with up to 2 moles per gram of platinum and an alcohol, ether, aldehyde, or mixtures thereof as described in U.S. Pat. No. 3,220,972, hereby incorporated by reference. Additional platinum-containing hydrosilylation catalysts useful in preparing the present organomodified silylated compounds are described in U.S. Pat. Nos. 3,715,334; 3,775,452; and 3,814,730 (Karstedt's catalyst), hereby incorporated by reference. Further background concerning hydrosilylation may be found in J. L. Spier, "Homogeneous Catalysis of Hydrosilylation by Transition Metals", in Advances in Organometallic Chemistry, volume 17, pages 407 through 447, F. G. A. Stone and R. West editors, published by Academic Press (New York, 1979), hereby incorporated by reference. Those skilled in the art can readily determine the effective amount of catalyst for a given hydrosilylation reaction. Generally, an amount of hydrosilylation catalyst ranging from about 0.1 to 50 parts per million by weight of the desired hydrosilylation will be satisfactory.

It will be appreciated by those skilled in the art that the reaction of compounds (I) and (II) provides a siloxane having a pendant polyether group. The following schematic provides an example of a product that may be formed from the reaction of compounds falling within the scope of materials (I) and (II):

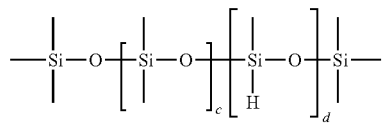 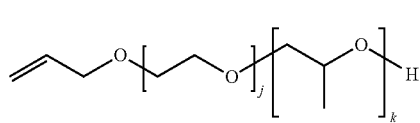

(I)  (II)

[Pt]

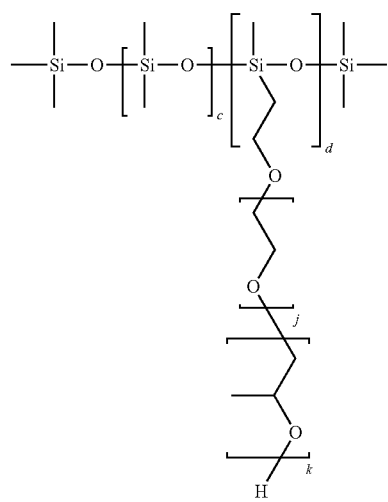

c = 1-1000
d = 0-400
j = 0-100
k = 0-100

The above schematic is simply an illustration of one compound that may be formed from the reaction of (I) and (II) and that the product formed from the reaction of (I) and (II) is not limited to the specific compound illustrated in the schematic.

It will be appreciated by those skilled in the art that the reaction of compounds (I), (II), and (III) will form a crosslinked product. The following schematic shows an example of a crosslinked product:

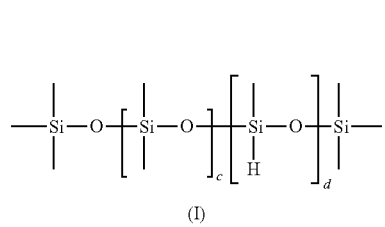

(I)

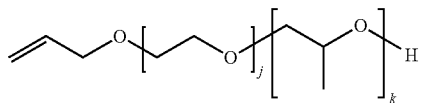

(II)

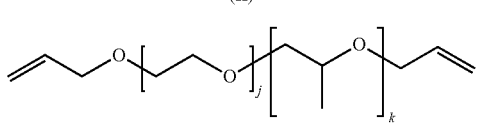

(III)

[Pt]

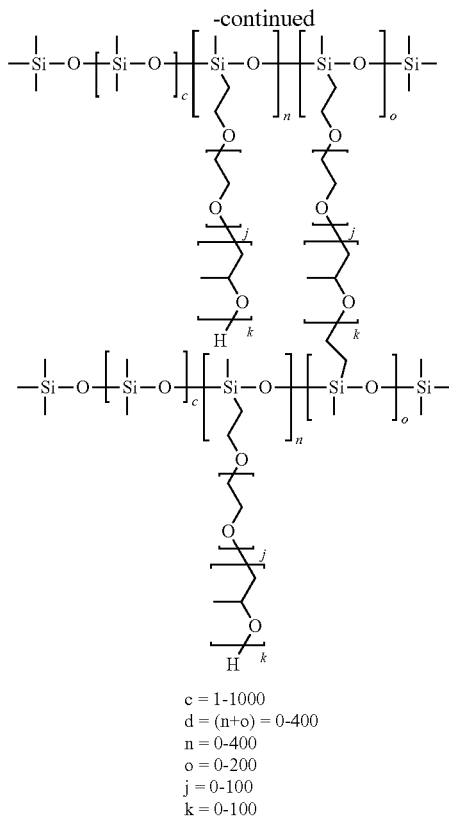

c = 1-1000
d = (n+o) = 0-400
n = 0-400
o = 0-200
j = 0-100
k = 0-100

The above schematic is simply an illustration of one compound that may be formed from the reaction of (I), (II), and (III), and that the product formed from the reaction of (I), (II), and (III) is not limited to the specific compound illustrated in the schematic.

The present organomodified silicones have been found to be useful as defoaming agents in fuel oils such as, for example, diesel fuels. Further, the present organomodified silicones have also been found to function as a dehazer in fuel oils such as, for example, diesel fuels. Providing both properties is an advantageous feature of the present compounds relative to other silicone based defoaming agents. Prior silicone defoaming agents have generally not been suitable as dehazing agents.

In one aspect, provided is a composition comprising (a) the present organomodified silicone, and (b) a fuel oil component, such as diesel fuel. In embodiments, organomodified silicone can be present in an amount of from about 1 ppm to about 20 ppm; 2 ppm to 15 ppm; 4 ppm to 12 ppm; or 5 ppm to 10 ppm. In one embodiment, the organomodified silicone is present in an amount of 1 ppm to 6 ppm. The organomodified silicone material may be added to the diesel fuel in any suitable manner or form. It can be added to the diesel fuel as an individual component or as part of an additive package that may include other desired additives for use in the fuel.

In one aspect, provided is an additive package comprising the present organomodified defoaming agents. The additive package may comprise other additives as may be desired to provide a particular effect in a fuel oil. In one embodiment, a diesel fuel additive package comprises:

(A) 10-90% by weight of (i) at least one aromatic hydrocarbon or hydrocarbon mixture having a boiling point or a predominant boiling range within the temperature range from 100° C. to 300° C., (ii) at least one $C_5$- to $C_{12}$-alkyl nitrate, or (iii) a mixture of (i) and (ii);

(B) 0.1 to 5% by weight, preferably 0.4 to 3% by weight, of at least one silicon-containing compound which will act both as a foam control agent and dehazer as mentioned in this present invention;

(C) 1 to 30% by weight, preferably 10 to 28% by weight, of at least one detergent additive;

where the sum of all components in the fuel additive package is 100% by weight in each case.

As known in the literature, typically diesel additive packages contain one or multiple organic dehazers to improve the rate of separation of water from the fuel. Common materials employed as organic dehazers include poly oxyalkylene alkyl phenol formaldehyde resin types and alkoxylation copolymers of ethylene oxide, propylene oxide, butylene oxide, styrene oxide and/or other oxides (e.g., epoxy-based resin types). For example, these products are available under the trade names NALCO 7D07 (Nalco), TOLAD 2898, 9360K, 9348, 9353K, 9327, 2683 (Baker Petrolite) or ER 130, 138 (RE Specialty Chemicals). Such organic dehazers are typically not effective in controlling foam in the fuel. The present invention owes the dual performance of (B) in particular to the balanced ratio of components (A), (B), and (C). The use of the organomodified silicone copolymer mentioned has an advantageous effect on both the foam control and dehazing characteristics of a fuel oil, especially in fuel oils which comprise biofuel oils or consist thereof. The present invention enables foam control and dehazing without the use of organic dehazers of the types described above. In one embodiment, the fuel additive package is free of a separate organic-based dehazer material.

In the additive package, component (A) essentially functions as a solvent. As a first alternative (i) the aromatic hydrocarbons suitable as component (A) include, for example, toluene, xylenes or homologous mono- or dialkylbenzenes, and technical solvent mixtures which consist of aromatic hydrocarbons or comprise aromatic hydrocarbons as main the component. Examples of suitable solvent mixtures, include those sold under the trade names Shellsol® (manufacturer: RoyalDutch/Shell Group), Exxsol®, or Solvesso® (manufacturer: ExxonMobil), or Solvent Naphtha. Also useful here, especially in a blend with the nonpolar organic solvents mentioned above, are polar organic solvents, including alcohols such as 2-ethylhexanol, n-octanol, n-nonanol, 2-propylheptanol, decanol, n-undecanol, n-dodecanol, n-tridecanol, and isotridecanol.

A second alternative (ii), component (A) may alternatively, or in combination with (A) (i) be chosen from $C_5$- to $C_{12}$-alkyl nitrates. Without being bound to any particular theory, $C_5$-$C_{12}$ alkyl nitrates may function as a cetane number improver or ignition accelerator in the fuel oil. Such alkyl nitrates are especially nitrate esters of unsubstituted or substituted aliphatic or else cycloaliphatic alcohols, usually having 5 to 10 carbon atoms. The alkyl group in these nitrate esters may be linear or branched, saturated or else unsaturated. Typical examples of such nitrate esters aren-amyl nitrate, isoamyl nitrate, 2-amyl nitrate, 3-amyl nitrate, tert-amyl nitrate, n-hexyl nitrate, n-heptyl nitrate, sec-heptylnitrate, n-octyl nitrate, 2-ethylhexyl nitrate, sec-octyl nitrate, n-nonyl nitrate, n-decyl nitrate, cyclopentyl nitrate, cyclohexyl nitrate, methylcyclohexyl nitrate and isopropylcyclohexyl nitrate, and also branched decyl nitrates with an n-propyl or isopropyl radical in the 2 position of the alkyl chain, as described in WO 2008/092809. Other suitable nitrates include, for example, nitrate esters of alkoxy-substituted aliphatic alcohols, such as 2-ethoxyethyl nitrate, 2-(2-ethoxy ethoxy)ethyl nitrate, 1-methoxypropyl nitrate or 4-ethoxybutyl nitrate. Still other suitable nitrates are diol nitrates such as 1,6-hexamethylene dinitrate. Among the alkyl nitrates mentioned, 2-ethylhexyl nitrate is the most commonly used cetane number improver and is also particularly suitable for the present fuel additive packages.

A third alternative (iii) for component (A) is that of a mixture of (i) and (ii). For example a mixture of 1 to 99 parts by weight of (i) and 99 to 1 parts by weight of (ii), 5 to 80 parts by weight of (i) and 95 to 20 parts of (ii), in particular of 25 to 75 parts by weight of (i) and 75 to 25 parts by weight of (ii), where the aromatic hydrocarbons (i) and the alkyl nitrates (ii) together add up to the amounts mentioned in the inventive additive package.

The detergent additive of component (C) refers to those materials whose action in an internal combustion engine, particularly a diesel engine, primarily consists or at least essentially of eliminating and/or preventing deposits. Particularly suitable detergents are amphiphilic substances that have at least one hydrophobic hydrocarbyl radical having a number-average molecular weight (Mn) of 75 to 10000, preferably of 250 to 6000, in particular of 500 to 2500, and at least one polar moiety. Examples of suitable detergents include, but are not limited to, aliphatic hydrocarbyl-substituted amines, hydrocarbyl-substituted poly(oxyalkylene) amines, hydrocarbyl-substituted succinimides, Mannich reaction products, nitro and amino aromatic esters of polyalkylphenoxyalkanols, polyalkylphenoxyaminoalkanes, etc. Exemplary detergent are those selected from compounds with moieties that are derived from succinic anhydride and have hydroxyl groups, amino groups, amido groups, and/or imido groups, or a combination of two or more thereof.

Additives comprising moieties which are derived from succinic anhydride and have hydroxyl and/or amino and/or amido and/or imido groups are, in one embodiment, corresponding derivatives of polyisobutenylsuccinic anhydride, which can be obtained by reaction of conventional or high-reactivity polyisobutene with a number average molecular weight (Mn) of 250 to 6000, in particular with a Mn of 500 to 2500, with maleic anhydride by the thermal route or via the chlorinated polyisobutene. Of particular interest in this context are derivatives with aliphatic polyamines such as ethylenediamine, diethylenetriamine, triethylenetetramine, or tetraethylenepentamine. The moieties with hydroxyl and/or amino and/or amido and/or imido groups are, for example, carboxylic acid groups, acid amides, acid amides of di- or polyamines, which also have free amine groups in addition to their amide function, succinic acid derivatives with an acid and an imide function, carboximides with monoamines, carboximides with di- or polyamines, which also have free amine groups in addition to the imide function, and diimides which are formed by the reaction of di- or polyamines with two succinic acid derivatives. Such fuel additives are described in, for example, U.S. Pat. Nos. 4,849,572, 5,752,989, and 9,102,891.

Particularly suitable additives with detergent action are compounds having moieties that are derived from succinic anhydride and have hydroxyl and/or amino and/or amido and/or imido groups, and particularly a compound that is a polyisobutenyl-substituted succinimide.

The detergent additive (C) may be present in an amount of from about 1 to about 30% by weight, from about 5 to about 25% by weight, or from about 10 to about 20% by weight of the fuel additive package.

The additive package is typically added to the fuel oil in such an amount that the detergent additive (C) or a mixture of a plurality of such additives with detergent action is present in the fuel oil in an amount of 5 to 3000 ppm by weight, in particular of 30 to 1000 ppm by weight. In one embodiment, the additive package is added to the fuel in an amount of from about 50 ppm to about 3000 ppm; from about 75 ppm to about 2500 ppm; from about 100 ppm to about 2000 ppm; from about 200 ppm to about 1500 ppm; or from about 750 ppm to about 1000 ppm. Here as elsewhere in the specification and claims, numerical values may be combined to form new and non-specified ranges.

The additive package or the fuel oil added therewith, i.e., corresponding diesel fuels, middle distillate fuels, or the mixtures of biofuel oils and middle distillates of fossil, vegetable, or animal origin, may further comprise other customary coadditives, such as, for example, cold flow improvers, corrosion inhibitors, antioxidants and stabilizers, metal deactivators, antistats, lubricity improvers, dyes (markers) and/or further solvents and diluents.

Cold flow improvers suitable as further coadditives include, but are not limited to, copolymers of ethylene with at least one further unsaturated monomer, in particular ethylene-vinyl acetate copolymers.

Corrosion inhibitors suitable as further coadditives include, but are not limited to, succinic esters, in particular with polyols, fatty acid derivatives, e.g., oleic esters, oligomerized fatty acids and substituted ethanolamines.

Antioxidants suitable as further coadditives include, but are not limited to, substituted phenols, e.g., 2,6-di-tert-butylphenol and 2,6-di-tert-butyl-3-methylphenol, and also phenylenediamines, e.g., N,N'-di-sec-butyl-p-phenylenediamine.

Metal deactivators suitable as further coadditives include, but are not limited to, salicylic acid derivatives, e.g., N,N'-disalicylidene-1,2-propanediamine.

A lubricity improver suitable as a further coadditive is, for example, glyceryl monooleate.

When the coadditives mentioned and/or further solvents or diluents are additionally used, they are used in the amounts as is now known or as may later be found to be suitable by those skilled in the art.

Fuel oils, as used herein, refers to middle distillate fuels, especially diesel fuels. However, the siloxane polymers disclosed herein may also be used in heating oil or kerosene. Diesel fuels or middle distillate fuels are typically mineral oil raffinates, which generally have a boiling range from 100 to 400° C. These are usually distillates with a 95% point up to 360° C. or even higher. However, they may also be what is called "ultralow sulfur diesel" or "city diesel", characterized by a 95% point of, for example, not more than 345° C. and a sulfur content of not more than 0.005% by weight, or by a 95% point of, for example, 285° C. and a sulfur content of not more than 0.001% by weight. In addition to the diesel fuels obtainable by refining, the main constituents of which are relatively long-chain paraffins, those obtainable by coal gasification or gas liquefaction ("gas to liquid" (GTL) fuels) are suitable. Also suitable are mixtures of the aforementioned diesel fuels with renewable fuels (biofuel oils) such as biodiesel or bioethanol. Of particular interest are diesel fuels with a low sulfur content, i.e., with a sulfur content of less than 0.05% by weight, particularly of less than 0.005% by weight and especially of less than 0.001% by weight of sulfur. Diesel fuels may also comprise water, for example in an amount up to 20% by weight. The water may be present in the form of diesel-water microemulsions, or in the form of what is called "White diesel."

The fuel oils may of course also consist to an extent of 100% by weight of at least one biofuel oil based on fatty acid esters. The bio fuel oil component is usually also referred to as "biodiesel." This typically comprises essentially alkyl esters of fatty acids, which derive from vegetable and/or animal oils and/or fats. Alkyl esters are typically understood to mean lower alkyl esters, especially C1- to C4-alkyl esters, which are obtainable by transesterification of the glycerides, especially triglycerides, which occur in vegetable and/or animal oils and/or fats by means of lower alcohols, for example ethanol, n-propanol, isopropanol, n-butanol, iso-butanol, sec-butanol, tert-butanol or especially methanol ("FAME").

Examples of vegetable oils that can be converted to corresponding alkyl esters and can thus serve as a basis for biodiesel, are castor oil, olive oil, peanut oil, palm kernel oil, coconut oil, mustard oil, cottonseed oil, and especially sunflower oil, palm oil, soybean oil and rapeseed oil. Further examples include oils, which can be obtained from wheat, jute, sesame, and the shea tree nut. Other suitable oils include arachis oil, jatropha oil and linseed oil. The extraction of these oils and the conversion thereof to the alkyl esters are known or can be determined by those skilled in the art.

It is also possible to convert vegetable oils that have already been used, for example used deep fat fryer oil, optionally after an appropriate purification, to alkyl esters, and for them thus to serve as a basis for biodiesel.

Vegetable fats are likewise also usable as a source for biodiesel, but play a minor role. Examples of animal fats and oils that are converted to corresponding alkyl esters and can thus serve as a basis for biodiesel are fish oil, bovine tallow, porcine tallow, and similar fats and oils, which are obtained as wastes in the slaughter or utilization of farm animals or wild animals. The parent saturated or unsaturated fatty acids of the vegetable and/or animal oils and/or fats mentioned, which usually have 12 to 22 carbon atoms and may bear additional functional groups such as hydroxyl groups, and occur in the alkyl esters, are especially lauric acid, myristic acid, palmitic acid, stearic acid, oleic acid, linoleic acid, linolenic acid, elaidic acid, erucic acid and/or ricinoleic acid. Typical lower alkyl esters based on vegetable and/or animal oils and/or fats, which find use as biodiesel or biodiesel components, are, for example, sunflower methyl ester, palm oil methyl ester ("PME"), soybean oil methyl ester ("SME") and especially rapeseed oil methyl ester ("RME"). However, it is also possible to use the monoglycerides, diglycerides, and especially triglycerides themselves, for example castor oil, or mixtures of such glycerides, as biodiesel or components for biodiesel.

The fuel oil component (b) shall be understood in the context of the present invention to mean the above-mentioned middle distillate fuels, especially diesel fuels, particularly those that boil within the range from 120 to 450° C.

The present invention also provides an additized fuel oil which comprises a major amount of (i) base fuel oil, the base fuel coil comprising (a) 0.1 to 100% by weight of at least one biofuel oil based on fatty acid esters, and (b) 0 to 99.9% by weight of middle distillates of fossil origin, vegetable, animal origin, or a combination of two or more thereof, the middle distillates (b) being essentially hydrocarbon mixtures that are free of fatty acid esters, and (ii) a minor amount of the inventive additive package.

The examples, which follow, are intended to illustrate aspects and embodiments of the present invention without restricting it.

Examples

The following examples are illustrative of the organo-modified silicone copolymer of the invention, its preparation, its properties, and its use as a foam control and dehazing agent in fuel additive compositions.

Examples

Synthesis of H-1 (M-D$_{72}$-D$^H_{18}$-M)

A 1000 mL 4 neck round bottom flask was equipped with a mechanical stirrer, reflux condenser with a N$_2$ inlet, addition funnel, thermocouple, and heating mantle. 574.46 g of decamethylcyclopentasiloxane, 87.52 g of polydimethylsiloxane with an optimum structure $(CH_3)_3SiO—(SiO(CH_3)_2)_{12}—OSi(CH_3)_3$, 138.02 g of polymethylhydrosiloxane with an optimum structure $(CH_3)_3SiO—(SiO(H)(CH_3))_{55}—OSi(CH_3)_3$, and 4.1 g of acid treated powdered clay (such as F-20, BASF corporation) were charged and stirred at 75° C. for 16 hours. The product was then cooled to room temperature and filtered. Structure was confirmed by NMR spectroscopy.

Synthesis of H-2 (M$^H$-D$_{72}$D$^H_{16}$M$^H$)

A 500 mL 4 neck round bottom flask was equipped with a mechanical stirrer, reflux condenser with an N$_2$ inlet, addition funnel, thermocouple, and heating mantle. 212.6 g of decamethylcyclopentasiloxane, 42.6 g of Si—H terminated polydimethylsiloxane with an optimum structure $(CH_3)_2(H)SiO—(SiO(CH_3)_2)_{12}—OSi(H)(CH_3)_2$, 44.8 g of 2,4,6,8-tetramethylcyclotetrasiloxane and 1.54 g of acid treated powdered clay (such as F-20, BASF corporation) were charged and stirred at 75° C. for 16 hours. The product was then cooled to room temperature and filtered.

The hydrides employed in the examples are prepared in line with the above described examples and have the following structures:

TABLE 1

| Example | M | $M^H$ | D | $D^H$ | T | $T^H$ | Q |
|---|---|---|---|---|---|---|---|
| H-1 | 2 |   | 72 | 18 |   |   |   |
| H-2 |   | 2 | 72 | 16 |   |   |   |
| H-3 | 2 |   | 80 | 20 |   |   |   |
| H-4 | 2 |   | 100 | 24 |   |   |   |
| H-5 | 2 |   | 130 | 32 |   |   |   |
| H-6 | 2 |   | 155 | 39 |   |   |   |
| H-7 | 2 |   | 155 | 39 | 0.1 |   |   |
| H-8 | 2 |   | 165 | 18 |   |   |   |

The polyethers employed as component (II) for producing the organomodified siloxane in the examples are selected from those described in Table 2:

TABLE 2

| Example | Optimized structure of compound (II) |
|---|---|
| PE-1 | $CH_2=CH-CH_2-O-(C_2H_4O)_{4.5}(C_3H_6O)_{5.1}-H$ |
| PE-2 | $CH_2=CH-CH_2-O-(C_2H_4O)_{2.8}(C_3H_6O)_{3.2}-H$ |
| PE-3 | $CH_2=CH-CH_2-O-(C_2H_4O)_{6.6}(C_3H_6O)_{7.2}-H$ |
| PE-4 | $CH_2=CH-CH_2-O-(C_2H_4O)_{12}-CO-CH_3$ |
| PE-5 | $CH_2=CH-CH_2-O-(C_2H_4O)_4(C_3H_6O)_{16}-H$ |
| PE-6 | $CH_2=CH-CH_2-O-(C_2H_4O)_4(C_3H_6O)_{20}-H$ |

The unsaturated compounds employed as component (III) in the examples are selected from those described in Table 3:

TABLE 3

| Example | Optimized structure of compound (II) |
|---|---|
| XL-1 | $CH_2=CH-CH_2-O-(C_2H_4O)_5(C_3H_6O)_{2.5}-CH_2-HC=CH_2$ |
| XL-2 | $CH_2=CH-CH_2-(CH_2)_6-CH_2-HC=CH_2$ |
| XL-3 | $CH_2=CH-SiO(CH3)_2-(SiO(CH3)_2)_8-OSi(CH3)_2-CH=CH_2$ |
| XL-4 | $CH_2=CH-SiO(CH3)_2-(SiO(CH3)_2)_{80}-OSi(CH3)_2-CH=CH_2$ |

Organomodified Silicone Copolymer (AF) Compositions

Synthesis of AF-1

A 3000 mL 4 neck round bottom flask was equipped with a mechanical stirrer, reflux condenser with an $N_2$ inlet, addition funnel, thermocouple and heating mantle. 200 g of silanic hydrogen fluid H-1 (Table-1), 1369 g of polyether PE-1 (Table-2), and 0.42 g of buffer (2-(dibutylamino) ethanol) were charged to the flask under nitrogen. This reaction mixture was stirred under nitrogen and heated up to 80° C. At this point, the heating mantle was removed and 0.8 mL of chloroplatinic catalyst solution in ethanol (about 4 ppm of Pt) was added to the flask. An exotherm was observed within 2 minutes and the temperature increased to 91.3° C. The reaction flask was immediately cooled in an ice-cold water bath to maintain a temperature below 95° C. 500 g of silanic hydrogen fluid, H-1 (Table-1) was charged slowly via an addition funnel to complete the hydrosilylation. Afterwards, the heating mantle was placed back and the reaction was maintained at 90° C. for 2 h. Silanic hydrogen content was checked at this point and found to be less than 0.1 cc hydrogen/g. The product was cooled to room temperature and bottled.

Synthesis of AF-2

A 250 mL 4 neck round bottom flask was equipped with a mechanical stirrer, reflux condenser with an $N_2$ inlet, addition funnel, thermocouple, and heating mantle. 30 g of silanic hydrogen fluid H-1 (Table-1), 128.9 g of polyether PE-1 (Table-1), 2.52 g of cross-linker XL-1 (Table-3), and 48 μL of buffer (2-(dibutylamino)ethanol) were charged to the flask under nitrogen. This reaction mixture was stirred under nitrogen and heated up to 85° C. At this point, the heating mantle was removed and 0.6 mL of chloroplatinic catalyst solution in ethanol (about 7 ppm of Pt) was added to the flask. An exotherm was observed within 2 minutes and the temperature increased to 97° C. The reaction flask was immediately cooled in an ice-cold water bath to maintain a temperature below 95° C. 40 g of silanic hydrogen fluid H-1 (Table-1) was charged slowly via an addition funnel to complete the hydrosilylation. Afterwards, the heating mantle was placed back and the reaction was maintained at 90° C. for 2 h. Silanic hydrogen content was checked at this point and found to be less than 0.1 cc hydrogen/g. The product was cooled to room temperature and bottled.

Synthesis of AF-3

The organomodified silicone copolymer composition AF-3 was carried out along the lines of the process described with respect to AF-1 except that hydride H-6 in Table 1 was used as the silanic hydride, and PE-1 in Table-2 was used as the polyether, and 20 wt. % Aromatic 150 was included as reaction solvent.

Synthesis of AF-4

The organomodified silicone copolymer composition AF-4 was carried out along the lines of the process described with respect to AF-1 except that hydride H-1 in Table 1 was used as the silanic hydride, and PE-2 in Table-2 was used as the polyether.

Examples of organomodified silicone copolymers synthesized from compounds (I), (II), and (III) in accordance with aspects and embodiments of the present technology (AF-1 to AF-4) as well as three comparative silicone based antifoams (AF-C1 to AF-C3) are given below in Table 4.

TABLE 4

| Example | Solvent, wt. % | M | D | D* | D** | |
|---|---|---|---|---|---|---|
| AF-1 | — | 2 | 72 | 18 | | D* = $-O_{0.5}Si-(CH_2)_3O-(C_2H_4O)_{4.5}(C_3H_6O)_{5.1}-H$ |
| AF-2 | — | 2 | 72 | 17.25 | 0.75 | D* = $-O_{0.5}Si-(CH_2)_3O-(C_2H_4O)_{4.5}(C_3H_6O)_{5.1}-H$ |
| | | | | | | D** = $-O_{0.5}Si-(CH_2)_3O-(C_2H_4O)_5(C_3H_6O)_{2.5}-(CH_2)_3-Si_{0.5}-$ |
| AF-3 | Aromatic 150, 20% | 2 | 155 | 39 | | D* = $-O_{0.5}Si-(CH_2)_3O-(C_2H_4O)_{4.5}(C_3H_6O)_{5.1}-H$ |
| AF-4 | — | 2 | 72 | 18 | | D* = $-O_{0.5}Si-(CH_2)_3O-(C_2H_4O)_{2.8}(C_3H_6O)_{3.2}-H$ |
| AF-C1 | DPG, 50% | 2 | 100 | 14.4 | 9.6 | D* = $-O_{0.5}Si-(CH_2)_3O-(C_2H_4O)_{7.5}-CH_3$ |
| | | | | | | D** = * = $-O_{0.5}Si-(CH_2)_3-C_6H_3(OCH_3)(OH)$ |
| AF-C2 | Aromatic 150, 20% | 2 | 100 | 11 | 13 | D* = $-O_{0.5}Si-(CH_2)_3O-(C_2H_4O)_4(C_3H_6O)_{16}-H$ |
| | | | | | | D** = * = $-O_{0.5}Si-(CH_2)_3-C_6H_4(OH)$ |
| AF-C3 | Aromatic 150, 20% | 2 | 130 | 14 | 16 | D* = $-O_{0.5}Si-(CH_2)_3O-(C_2H_4O)_4(C_3H_6O)_{16}-H$ |
| | | | | | | D** = * = $-O_{0.5}Si-(CH_2)_3-C_6H_4(OH)$ |

Application Testing

For evaluating the capability of the organomodified silicone copolymers of this invention as a (i) foam control agent, and (ii) dehazer in diesel fuel, the corresponding standard foam test method according to BNPe NF-M 07-075 foam test and dehazing test according to ASTM D 1094 were applied respectively. As a part of the BNPe NF-M 07-075 foam test, the foam volume and the foam collapse time were measured for all cases. As a part of the ASTM D 1094 test, the quality of the water-diesel interface ("interface"), the diesel phase, and the water phase, as well as the amount of water that remains emulsified after a fixed period of time (300 s), and the time required to separate 15 mL and 20 mL of water were determined.

The tests were carried through in (i) a commercially available diesel fuel composed of 100% of middle distillates of fossil origin ("B0"), (ii) a commercially available biodiesel containing diesel fuel composed of 93% by weight of middle distillates of fossil origin and 7% by weight of FAME ("B7") and (iii) a commercially available biodiesel containing diesel fuel composed of 85% by weight of middle distillates of fossil origin and 15% by weight of FAME ("B15").

Eighteen different additive packages were formulated. These type of formulations are widely available such as is described in US Patent Publication 2012/0222348 and U.S. Pat. No. 9,039,791. Three comparative silicone antifoam (AF-C1 to AF-C3) and one conventional organic dehazer ER-130 (RE Specialty Chemicals, UK) were used for comparative purpose as listed in Table 5 and Table 6.

TABLE 5

| | | Package example Wt. % | | | | | | | | |
|---|---|---|---|---|---|---|---|---|---|---|
| Component | | P-1 | P-2 | P-3 | P-4 | P-5 | P-6 | P-7 | P-8 | P-9 |
| (A) | Aromatic 150 ND | 80 | 77.5 | 77.5 | 77.5 | 77.5 | 77.5 | 77.5 | 77.5 | 77.5 |
| (B) | AF-1 | | 2.5 | | | | | | | |
| | AF-2 | | | 2.5 | | | | | | |
| | AF-3 | | | | 2.5 | | | | | |
| | AF-4 | | | | | 2.5 | | | | |
| Comparative antifoam | AF-C1 | | | | | | 2.5 | | | |
| | AF-C2 | | | | | | | 2.5 | | |
| | AF-C3 | | | | | | | | 2.5 | |
| Comparative dehazer | ER-130 | | | | | | | | | 2.5 |
| (C) | PIBSI-1 | 20 | 20 | 20 | 20 | 20 | 20 | 20 | 20 | 20 |
| | Total | 100 | 100 | 100 | 100 | 100 | 100 | 100 | 100 | 100 |
| | Treat rate (ppm) | 200 | 200 | 200 | 200 | 200 | 200 | 200 | 200 | 200 |

TABLE 6

| | | Package example Wt. % | | | | | | | | |
|---|---|---|---|---|---|---|---|---|---|---|
| Component | | Q-1 | Q-2 | Q-3 | Q-4 | Q-5 | Q-6 | Q-7 | Q-8 | Q-9 |
| (A) | 2Ethylhexyl nitrate | 70 | 70 | 70 | 70 | 70 | 70 | 70 | 70 | 70 |
| | Aromatic 150 ND | 19 | 18.5 | 18.5 | 18.5 | 18.5 | 18 | 18.5 | 18.5 | 18.5 |
| | 2Ethylhexanol | 7 | 7 | 7 | 7 | 7 | 7 | 7 | 7 | 7 |
| (B) | AF-1 | | 0.5 | | | | | | | |
| | AF-2 | | | 0.5 | | | | | | |
| | AF-3 | | | | 0.5 | | | | | |
| | AF-4 | | | | | 0.5 | | | | |

TABLE 6-continued

| Component | | Package example | | | | | | | | |
|---|---|---|---|---|---|---|---|---|---|---|
| | | Q-1 | Q-2 | Q-3 | Q-4 | Q-5 Wt. % | Q-6 | Q-7 | Q-8 | Q-9 |
| Comparative Antifoam | AF-C1 | | | | | | 1 | | | |
| | AF-C2 | | | | | | | 0.5 | | |
| | AF-C3 | | | | | | | | 0.5 | |
| Comparative Dehazer | DZ-1 | | | | | | | | | 0.5 |
| (C) | PIBSI-1 | 4 | 4 | 4 | 4 | 4 | 4 | 4 | 4 | 4 |
| | Total | 100 | 100 | 100 | 100 | 100 | 100 | 100 | 100 | 100 |
| | Treat rate (ppm) | 1000 | 1000 | 1000 | 1000 | 1000 | 1000 | 1000 | 1000 | 1000 |

Foam Control Performance of Organomodified Silicone Copolymers

The BNPe NF-M 07-075 foam test is a standard test method for determining the foam volume and the foam collapse time of fuel oil samples. For this purpose, a test apparatus standardized according to this standard is used. The various packages were evaluated and representative data were listed in Table 7 and Table 8 for example purpose.

Package P-1 is a control that does not include any defoamer or dehazer. In each trial, a sample is Table 7 demonstrates that the organomodified silicone copolymers of the present invention (in packages P2-P5) show equivalent or improved foam control performance relative to the compounds used in comparative packages (P6-P8). Package P-9 contains no defoamer but contains a comparative dehazer.

TABLE 7

| Fuel | Package | Foam Volume (ml) | Defoam time (s) |
|---|---|---|---|
| B0 | | 108 | 60 |
| | P-1 | 92 | 57.3 |
| | P-2 | 56 | 10.8 |
| | P-3 | 43 | 10 |
| | P-4 | 50 | 8.3 |
| | P-5 | 63 | 8.1 |
| | P-6 | 58 | 7.2 |
| | P-7 | 60 | 8.3 |
| | P-8 | 61 | 6.2 |
| | P-9 | 87 | 50.3 |
| B7 | | 105 | 49.5 |
| | P-1 | 102 | 35.2 |
| | P-2 | 47 | 6.9 |
| | P-3 | 42 | 2 |
| | P-4 | 36 | 2.1 |
| | P-5 | 52 | 8.7 |
| | P-6 | 34 | 1.5 |
| | P-7 | 60 | 3.1 |
| | P-8 | 53 | 2.8 |
| | P-9 | 97 | 54 |
| B15 | | 102 | 41 |
| | P-1 | 101 | 38.4 |
| | P-2 | 41 | 7.2 |
| | P-4 | 47 | 9.7 |
| | P-6 | 41 | 9.5 |
| | P-7 | 55 | 7.0 |
| | P-8 | 54 | 3.4 |
| | P-9 | 102 | 32.8 |

Similarly, Package Q-1 is a control that does not include any defoamer or dehazer. In each trial, a sample is Table 8 demonstrates that the organomodified silicone copolymers of the present invention (in packages Q2-Q5) show equivalent or improved foam control performance relative to the compounds used in comparative packages (Q6-Q8). Package Q-9 contains no defoamer but contains a comparative dehazer.

TABLE 8

| Fuel | Package | Foam Volume (ml) | Defoam time (s) |
|---|---|---|---|
| B0 | | 108 | 60.0 |
| | Q-1 | 101 | 48.0 |
| | Q-2 | 84 | 13.4 |
| | Q-3 | 77 | 12.4 |
| | Q-4 | 71 | 10.5 |
| | Q-5 | 81 | 11.8 |
| | Q-6 | 74 | 11.9 |
| | Q-7 | 65 | 8.4 |
| | Q-8 | 61 | 8.9 |
| | Q-9 | 100 | 50.9 |
| B7 | | 105 | 49.5 |
| | Q-1 | 101 | 55.1 |
| | Q-2 | 51 | 9.3 |
| | Q-3 | 73 | 11.7 |
| | Q-6 | 64 | 10.0 |
| | Q-7 | 58.5 | 5.0 |
| | Q-8 | 47 | 4.3 |
| | Q-9 | 100 | 55.4 |
| B15 | | 102 | 41.0 |
| | Q-1 | 59.6 | 107 |
| | Q-2 | 100 | 14.4 |
| | Q-4 | 77 | 9.3 |
| | Q-5 | 83 | 15.0 |
| | Q-6 | 65 | 8.9 |
| | Q-7 | 71 | 8.5 |
| | Q-8 | 50 | 3.6 |
| | Q-9 | 105 | 59.6 |

Dehazing Performance of Organomodified Silicone Copolymers

For evaluating the capability of the present reaction products of separating water from diesel fuels containing an additive with detergent action, the corresponding standard test method according to ASTM D 1094 was applied. The various packages were evaluated and representative data were listed in Table 9 and Table 10 for example purpose.

Package P-1 is a control that does not include any defoamer or dehazer. In each trial, a sample is Table 9 demonstrates that the organomodified silicone copolymers of the present invention (in packages P2-P5) show equivalent or improved foam control performance relative to the compounds used in comparative packages (P6-P8). Package P-9 contains no defoamer but contains a comparative dehazer.

TABLE 9

| Fuel | Package | 15 ml separation time (s) | 20 ml Separation time (s) | Emulsified aqueous layer (ml) at 300 s | Fuel haze | Water haze | Interface | Separation |
|---|---|---|---|---|---|---|---|---|
| B0 |  | 5 | 20 | 0 | 1 | 1 | 1 | 1 |
|  | P-1 | >900 | >900 | 13.5 | 1-2 | 1 | 3-4 | 3 |
|  | P-2 | 75 | 200 | 0 | 2 | 1 | 1-2 | 2 |
|  | P-3 | 80 | 236.5 | 0 | 3 | 1 | 1b-2 | 2 |
|  | P-4 | 53 | 143.5 | 0 | 2-3 | 1 | 1b-2 | 2 |
|  | P-5 | 72 | 239 | 0 | 1-2 | 1 | 1b | 2 |
|  | P-6 | 195 | >750 | 1.5 | 2 | 1 | 3-4 | 3 |
|  | P-7 | >900 | >900 | 8 | 2-3 | 1 | 3-4 | 3 |
|  | P-8 | >900 | >900 | 9 | 3 | 1 | 3-4 | 3 |
|  | P-9 | 97.5 | 194 | 0 | 1-2 | 1 | 1b | 2 |
| B 7 |  | 10 | 88 | 0 | 2 | 1 | 2 | 2 |
|  | P-1 | >900 | >900 | 8.5 | 3 | 1 | 3-4 | 3 |
|  | P-2 | 38 | 246 | 0 | 2-3 | 1 | 2 | 2 |
|  | P-3 | 32 | 275 | 0 | 4 | 1 | 3 | 2-3 |
|  | P-4 | 16.5 | 207 | 0 | 5 | 1 | 2 | 2 |
|  | P-5 | 23 | 109 | 0 | 2 | 1 | 2 | 2 |
|  | P-6 | 22 | >900 | 1 | 2-3 | 1 | 4 | 3 |
|  | P-7 | 337 | >900 | 5.5 | 3 | 1 | 3-4 | 3 |
|  | P-8 | 72 | >900 | 3.5 | 6 | 1 | 4 | 3 |
|  | P-9 | 46 | 727 | <1 | 2-3 | 1 | 3 | 3 |
| B 15 |  | 13 | 145 | 0 | 2 | 1 | 2 | 2 |
|  | P-1 | 86 | >900 | 5 | 3-4 | 1 | 3-4 | 3 |
|  | P-2 | 24 | 204 | 0 | 4 | 1 | 2 | 2 |
|  | P-4 | 29 | 146 | 0 | 5-6 | 1 | 2 | 2 |
|  | P-6 | 19 | >900 | 2 | 4 | 1 | 4 | 3 |
|  | P-7 | 366 | >900 | 3-7 | 2-6 | 1 | 3-4 | 3 |
|  | P-8 | 102 | >900 | 1-5 | 2-6 | 1 | 3-4 | 3 |
|  | P-9 | 29 | 239 | 0 | 2 | 1 | 3 | 2 |

Similarly, Package Q-1 is a control that does not include any defoamer or dehazer. In each trial, a sample is Table 8 demonstrates that the organomodified silicone copolymers of the present invention (in packages Q2-Q5) show equivalent or improved foam control performance relative to the compounds used in comparative packages (Q6-Q8). Package Q-9 contains no defoamer but contains a comparative dehazer.

TABLE 10

| Fuel | Package | 15 ml separation time (s) | 20 ml Separation time (s) | Emulsified aqueous layer (ml) at 300 s | Fuel haze | Water haze | Interface | Separation |
|---|---|---|---|---|---|---|---|---|
| B0 |  | 3.5 | 32 | 0 | 1 | 1 | 1 | 1 |
|  | Q-1 | 675 | 900 | 7-8 | 1-2 | 1 | 3-4 | 3 |
|  | Q-2 | 82 | 270 | 0 | 1-3 | 1 | 1b-2 | 2 |
|  | Q-3 | 47 | 137 | 0 | 1-2 | 1 | 1b | 1-2 |
|  | Q-4 | 47 | 139 | 0 | 1-3 | 1 | 1b | 1-2 |
|  | Q-5 | 11 | 168 | 0 | 2-3 | 1 | 1b | 2 |
|  | Q-6 | 2 | 900 | 1-2 | 3-4 | 1 | 3-4 | 3 |
|  | Q-7 | 566 | 900 | 5-7 | 2 | 1 | 3-4 | 3 |
|  | Q-8 | 492 | 900 | 4-7 | 2-3 | 1 | 3-4 | 3 |
|  | Q-9 | 98 | 227 | 0 | 1-2 | 1 | 1b-2 | 2 |
| B7 |  | 10 | 88 | 0 | 2 | 1 | 2 | 2 |
|  | Q-1 | 615 | 900 | 14-15 | 1-2 | 1 | 3-4 | 3 |
|  | Q-2 | 25 | 308 | 0-1 | 2-4 | 1 | 1b-3 | 2-3 |
|  | Q-3 | 26 | 145 | 0 | 2-3 | 1 | 2 | 2 |
|  | Q-6 | 20 | 584 | 0-2 | 2-4 | 1 | 2-4 | 2-3 |
|  | Q-7 | 558 | 900 | 4-7 | 2-3 | 1 | 3-4 | 3 |
|  | Q-8 | 32 | 900 | 3-4 | 2-6 | 1 | 3-4 | 3 |
|  | Q-9 | 26 | 284 | 0-1 | 1-3 | 1 | 1b-2 | 2 |
| B15 |  | 13 | 145 | 0 | 2 | 1 | 2 | 2 |
|  | Q-1 | 565 | 900 | 7 | 4 | 1 | 3-4 | 3 |
|  | Q-2 | 16 | 33 | 0 | 2-3 | 1 | 2 | 2 |
|  | Q-4 | 24 | 60 | 0 | 1-4 | 1 | 1b-2 | 2 |
|  | Q-5 | 32 | 97 | 0 | 1-3 | 1 | 1b-2 | 1-2 |
|  | Q-6 | 39 | 900 | 1-3 | 3-6 | 1 | 4 | 3 |
|  | Q-7 | 466 | 900 | 2-8 | 3-6 | 1 | 3-4 | 3 |
|  | Q-8 | 79 | 900 | 3-4 | 3-6 | 1 | 3-4 | 3 |
|  | Q-9 | 48 | 299 | 0-1 | 1-3 | 1 | 1b-2 | 2 |

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of an organomodified silicone compound, an additive package comprising such compounds, and a fuel oil comprising such compounds and/or additive packages. Modifications may occur to those skilled in the art and to those who may make and use the invention. The disclosed embodiments are merely for illustrative purposes and not intended to limit the scope of the invention or the subject matter set forth in the claims.

What is claimed is:

1. A fuel additive package comprising:
   (A) 10-90% by weight of (i) at least one aromatic hydrocarbon or hydrocarbon mixture having a boiling point or a predominant boiling range within the temperature range from 100° C. to 300° C., or (ii) at least one $C_5$- to $C_{12}$-alkyl nitrate, or (iii) a mixture of (i) and (ii);
   (B) 0.1 to 5% by weight of an organomodified silicone; and
   (C) 1 to 40% by weight of a detergent additive, where the sum of all components in the fuel additive package is 100%;
   where the organomodified silicone (B) is the reaction product of (I) with (II) and optionally with (III) in addition to (II) where,
   (I) is a silanic hydrogen containing compound having the formula $M_a M^H_b D_c D^H_d T_e T^H_f Q_g$ where:
   $M = R^1 R^2 R^3 SiO_{1/2}$
   $M^H = R^4 R^5 HSiO_{1/2}$
   $D = R^6 R^7 SiO_{2/2}$
   $D^H = R^8 SiO_{2/2}$
   $T = R^9 SiO_{3/2}$
   $T^H = HSiO_{3/2}$
   $Q = SiO_{4/2}$
   where $R^1$, $R^2$, $R^3$, $R^4$, $R^5$, $R^6$, $R^7$, $R^8$, and $R^9$ are each independently selected from the group of monovalent hydrocarbon radicals containing 1 to 60 carbon atoms;
   the subscript a and b may be zero or positive subject to the limitation that when the subscript a is zero, b must be positive or when b is zero, a must be positive and (a+b)=2;
   the subscript c has a value ranging from about 25 to about 400;
   the subscript d has a value ranging from about 5 to about 75;
   the subscript e is zero or positive and has a value ranging from about 0 to about 5 subject to limitation that (e+f)<5;
   the subscript f is zero or positive and has a value ranging from about 0 to about 5 subject to limitation that (e+f)<5;
   the subscript g is zero or positive and has a value ranging from 0 to about 5;

(II) is an unsaturated compound comprising at least one terminal unsaturated group having the formula $CH_2=C(R^{10})(R^{11})_h-O-(R^{12})_i(C_2H_4O)_j(C_3H_6O)_k(C_4H_8O)_l R^{13}$ where, $R^{10}$ is H or a monovalent hydrocarbon radical containing 1 to 6 carbon atoms; $R^{11}$ is a divalent hydrocarbon radical containing 1 to 6 carbons atoms; $R^{12}$ is selected from the group of divalent radical consisting of $-C_2H_4O-$, $-C_3H_6O-$, and $-C_4H_8O-$; $R^{13}$ is H, a monovalent hydrocarbon radical containing) to 6 carbons, or acetyl; the subscript h is zero or one; the subscript i is zero or one; the subscript j is zero or positive and has a value ranging from 0 to about 50 subject to the limitation that (j+k+l)>0; the subscript k is zero or positive and has a value ranging from 0 to about 50 subject to the limitation that (j+k+l)>0; the subscript l is zero or positive and has a value ranging from 0 to about 20 subject to the limitation that (j+k+l)>0; and optionally (III) an unsaturated compound comprising at least two unsaturated functional group having the formula $CH_2=C(R^{14})-B-(R^{15})C=CH_2$, where, $R^{14}$ and $R^{15}$ are independently H or a monovalent hydrocarbon radical containing 1 to 6 carbon atoms;
B is either E, F, or G
E is $(R^{11})_h-O-(R^{12})_i(C_2H_4O)_j(C_3H_6O)_k(C_4H_8O)_l-(R^{12})-O-(R^{11})_h$
$R^{11}$ in E is a divalent hydrocarbon radical containing 1 to 6 carbon atoms; $R^{12}$ is chosen from a divalent radical of $-C_2H_4O-$, $-C_3H_6O-$, or $-C_4H_8O-$;
the subscript h is zero or one;
the subscript i is zero or one;
the subscript j is zero or positive and has a value ranging from 0 to about 50 subject to the limitation that (j+k+l)>0;
the subscript k is zero or positive and has a value ranging from 0 to about 50 subject to the limitation that (j+k+l)>0;
the subscript l is zero or positive and has a value ranging from 0 to about 50 subject to the limitation that (j+k+l)>0;
F is a divalent hydrocarbon radical consisting of 1-60 carbons, which can be linear or branched; and
G is a silicon containing compound having a formula $(R^{16})(R^{17})SiO-((R^{18})(R^{19})SiO))_m-SiO(R^{20})(R^{21})$ where $R^{16}$, $R^{17}$, $R^{18}$, $R^{19}$, $R^{20}$, and $R^{21}$ are each independently selected from the group of monovalent hydrocarbon radicals containing 1 to 60 carbon atoms; and the subscript m is zero or positive and has a value ranging from 0 to about 500.

2. The fuel additive package of claim 1, wherein in the organomodified silicone (B) $R^1$, $R^2$, $R^3$, $R^4$, $R^5$, $R^6$, $R^7$, $R^8$, and $R^9$ are independently selected from a monovalent radical containing 1-20 carbon atoms; c is 40 to about 200; d is 5 to about 60; e is 0 to about 10; f is 0 to about 10; j in (II) or (III) is 0 to about 40; k in (II) or (III) is 0 to about 40; l in (II) or (III) is 0 to 40; f is 1 to about 25; $R^{16}$, $R^{17}$, $R^{18}$, $R^{19}$, $R^{20}$, and $R^{21}$ are each independently selected from the group of monovalent hydrocarbon radicals containing 1 to 25 carbon atoms; and m is 0 to about 500.

3. The fuel additive package of claim 1, wherein in the organomodified silicone (B) in the silanic hydride (I), c is from about 50 to about 100, d is from about 5 to about 50, e is about 0 to about 1, and g is 0.

4. The fuel additive package of claim 1, wherein in the unsaturated compound (II), j is about 1 to about 20, k is about 1 to about 25, and l is 0.

5. The fuel additive package of claim 1, wherein $R^1$-$R^9$ is methyl.

6. The fuel additive package of claim 1, wherein $R^{10}$ is methyl, $R^{11}$ and $R^{12}$ are methylene, and h is 1.

7. The fuel additive package of claim 1, wherein the ratio of c to d in the silanic hydride (I) is from about 6:1 to about 1:6.

8. The fuel additive package of claim 1, wherein the ratio of j to (j+k+l) in the unsaturated compound (II) is from 0.25 to 0.95; the ratio of k to (j+k+l) is 0.05 to 0.75; and the ratio of l to (j+k+l) is 0.05 to 0.75.

9. The fuel additive package of claim 1, wherein l is zero in the unsaturated compound (II), the ratio of j to (j+k) in the unsaturated compound (II) is from 0.25 to 0.95; and the ratio of k to (j+k) is 0.05 to 0.75.

10. The fuel additive package of claim 1 comprising from about 0.5 to about 2.5% by weight of the organomodified silicone (B).

11. The fuel additive package of claim 1, wherein (A) comprises the (i) at least one aromatic hydrocarbon or hydrocarbon mixture having a boiling point or a predominant boiling range within the temperature range from 100° C. to 300° C.

12. The fuel additive package of claim 1, wherein (A) comprises the (ii) at least one $C_5$- to $C_{12}$-alkyl nitrate.

13. The fuel additive package of claim 1, wherein (A) comprises (i) and (ii).

14. A composition comprising (a) a fuel oil, and (b) the fuel additive package of claim 1.

15. The composition of claim 14, wherein in the organomodified silicone (B) $R^1$, $R^2$, $R^3$, $R^4$, $R^5$, $R^6$, $R^7$, $R^8$, and $R^9$ are independently selected from a monovalent radical containing 1-20 carbon atoms; c is 0 to about 500; d is 0 to about 60; e is 0 to about 10; f is 0 to about 10; j in (II) or (III) is 0 to about 40; k in (II) or (III) is 0 to about 40; l in (II) or (III) is 0 to 40; F is 1 to about 25; $R^{16}$, $R^{17}$, $R^{18}$, $R^{19}$, $R^{20}$, and $R^{21}$ are each independently selected from the group of monovalent hydrocarbon radicals containing 1 to 25 carbon atoms; and m is 0 to about 500.

16. The composition of claim 14, wherein in the organomodified silicone (B) in the silanic hydride (I), c is from about 40 to about 200, d is from about 5 to about 50, e is about 0 to about 1, and g is 0.

17. The composition of claim 14, wherein in the unsaturated compound (II), j is about 1 to about 20, k is about 1 to about 25, and l is 0.

18. The composition of claim 14, wherein $R^1$-$R^9$ is methyl.

19. The composition of claim 14, wherein $R^{10}$ is methyl, $R^{11}$ and $R^{12}$ are methylene, and h is 1.

20. The composition of claim 14, wherein the ratio of c to d is from about 6:1 to about 1:6.

21. The composition of claim 14, wherein the ratio of j to (j+k+l) in the unsaturated compound (II) is from 0.25 to 0.95; the ratio of k to (j+k+l) is 0.05 to 0.75; and the ratio of l to (j+k+l) is 0.05 to 0.75.

22. The composition of claim 14, wherein l is zero in the unsaturated compound (II), the ratio of j to (j+k) in the unsaturated compound (II) is from 0.25 to 0.95; and the ratio of k to (j+k) is 0.05 to 0.75.

23. The composition of claim 14 wherein the fuel additive package comprises from about 0.5 to about 2.5% by weight of the organomodified silicone (B).

24. The composition of claim 14, wherein (A) comprises the (i) at least one aromatic hydrocarbon or hydrocarbon mixture having a boiling point or a predominant boiling range within the temperature range from 100° C. to 300° C.

25. The composition of claim 14, wherein (A) comprises the (ii) at least one $C_5$- to $C_{12}$-alkyl nitrate.

26. The composition of claim 14, wherein (A) comprises (i) and (ii).

27. The composition of claim 14, wherein the fuel additive package is added in an amount of from about 50 ppm to about 3000 ppm by weight based on the total weight of the composition.

28. The composition of claim 14, wherein the organomodified silicone (a) is present in an amount of 1 ppm to 20 ppm based on the weight of the composition.

29. A method of treating a fuel composition comprising adding the fuel additive package of claim 1 to a fuel oil, wherein the fuel additive package acts as both a defoamer and a dehazer in the fuel composition.

30. An organomodified silicone that is the reaction product of (I) with (II) and optionally with (III) in addition to (II) where,
(I) is a silanic hydrogen containing compound having the formula $M_a M^H_b D_c D^H_d T_e T^H_f Q_g$ where:
$M = R^1 R^2 R^3 SiO_{1/2}$
$M^H = R^4 R^5 HSiO_{1/2}$
$D = R^6 R^7 SiO_{2/2}$
$D^H = R^8 HSiO_{2/2}$
$T = R^9 SiO_{3/2}$
$T^H = HSiO_{3/2}$
$Q = SiO_{4/2}$
where $R^1$, $R^2$, $R^3$, $R^4$, $R^5$, $R^6$, $R^7$, $R^8$, and $R^9$ are each independently selected from the group of monovalent hydrocarbon radicals containing 1 to 60 carbon atoms;
the subscript a and b may be zero or positive subject to the limitation that when the subscript a is zero, b must be positive or when b is zero, a must be positive and (a+b)=2;
the subscript c has a value ranging from about 25 to about 400;
the subscript d has a value ranging from about 5 to about 75;
the subscript e is zero or positive and has a value ranging from about 0 to about 5 subject to limitation that (e+f)<5;
the subscript f is zero or positive and has a value ranging from about 0 to about 5 subject to limitation that (e+f)<5;
the subscript g is zero or positive and has a value ranging from 0 to about 5;
(II) is an unsaturated compound comprising at least one terminal unsaturated group having the formula $CH_2=C(R^{10})(R^{11})_h-O-(R^{12})_i(C_2H_4O)_j(C_3H_6O)_k(C_4H_8O)_l R^{13}$ where, $R^{10}$ is H or a monovalent hydrocarbon radical containing 1 to 6 carbon atoms; $R^{11}$ is a divalent hydrocarbon radical containing 1 to 6 carbons atoms; $R^{12}$ is selected from the group of divalent radical consisting of $-C_2H_4O-$, $-C_3H_6O-$, and $-C_4H_8O-$; $R^{13}$ is H, a monovalent hydrocarbon radical containing 1 to 6 carbons, or acetyl; the subscript h is zero or one; the subscript i is zero or one; the subscript j is zero or positive and has a value ranging from 0 to about 50 subject to the limitation that (j+k+l)>0; the subscript k is zero or positive and has a value ranging from 0 to about 50 subject to the limitation that (j+k+l)>0; the subscript l is zero or positive and has a value ranging from 0 to about 20 subject to the limitation that (j+k+l)>0; and
optionally (III) an unsaturated compound comprising at least two unsaturated functional group having the formula $CH_2=C(R^{14})-B-(R^{15})C=CH_2$, where, $R^{14}$ and $R^{15}$ are independently H or a monovalent hydrocarbon radical containing 1 to 6 carbon atoms;

B is either E, F, or G

E is $(R^{11})_h$—O—$(R^{12})_i(C_2H_4O)_j(C_3H_6O)_k(C_4H_8O)_l$—$(R^{12})$—O—$(R^{11})_h$ $R^{11}$ in E is a divalent hydrocarbon radical containing 1 to 6 carbon atoms; $R^{12}$ is chosen from a divalent radical of —$C_2H_4O$—, —$C_3H_6O$—, or —$C_4H_8O$—;

the subscript h is zero or one;

the subscript i is zero or one;

the subscript j is zero or positive and has a value ranging from 0 to about 50 subject to the limitation that (j+k+l)>0;

the subscript k is zero or positive and has a value ranging from 0 to about 50 subject to the limitation that (j+k+l)>0;

the subscript l is zero or positive and has a value ranging from 0 to about 50 subject to the limitation that (j+k+l)>0;

F is a divalent hydrocarbon radical consisting of 1-60 carbons, which can be linear or branched; and G is a silicon containing compound having a formula $(R^{16})(R^{17})SiO$—$((R^{18})(R^{19})SiO))_m$—$SiO(R^{20})(R^{21})$ where $R^{16}$, $R^{17}$, $R^{18}$, $R^{19}$, $R^{20}$, and $R^{21}$ are each independently selected from the group of monovalent hydrocarbon radicals containing 1 to 60 carbon atoms; and the subscript m is zero or positive and has a value ranging from 0 to about 500.

31. The organomodified silicone of claim 30, wherein in the organomodified silicone (B) $R^1$, $R^2$, $R^3$, $R^4$, $R^5$, $R^6$, $R^7$, $R^8$, and $R^9$ are independently selected from a monovalent radical containing 1-20 carbon atoms; c is 40 to about 200; d is 0 to about 60; e is 0 to about 5; f is 0 to about 5; j in (II) or (III) is 0 to about 40; k in (II) or (III) is 0 to about 40; l in (II) or (III) is 0 to 40; F is 1 to about 25; $R^{16}$, $R^{17}$, $R^{18}$, $R^{19}$, $R^{20}$, and $R^{21}$ are each independently selected from the group of monovalent hydrocarbon radicals containing 1 to 25 carbon atoms; and m is 0 to about 500.

32. The organomodified silicone of claim 30, wherein in the organomodified silicone (B) in the silanic hydride (I), c is from about 50 to about 100, d is from about 5 to about 50, e is about 0 to about 1, and g is 0.

33. The organomodified silicone of claim 30, wherein in the unsaturated compound (II), j is about 1 to about 20, k is about 1 to about 25, and l is 0.

34. The organomodified silicone of claim 30, wherein $R^1$-$R^9$ is methyl.

35. The organomodified silicone of claim 30, wherein $R^{10}$ is methyl, $R^{11}$ and $R^{12}$ are methylene, and h is 1.

36. The organomodified silicone of claim 30, wherein the ratio of c to d is from about 6:1 to about 1:6.

37. The organomodified silicone of claim 30, wherein the ratio of j to (j+k+l) in the unsaturated compound (II) is from 0.25 to 0.95; the ratio of k to (j+k+l) is 0.05 to 0.75; and the ratio of l to (j+k+l) is 0.05 to 0.75.

38. The organomodified silicone of claim 30, wherein l is zero in the unsaturated compound (II), the ratio of j to (j+k) in the unsaturated compound (II) is from 0.25 to 0.95; and the ratio of k to (j+k) is 0.05 to 0.75.

39. The composition of claim 1, wherein the composition is free of an organic dehazer.

* * * * *